(12) United States Patent
Howe

(10) Patent No.: US 6,478,044 B2
(45) Date of Patent: Nov. 12, 2002

(54) SNAP-ACTION PILOTED FILL VALVE

(75) Inventor: Samuel H. Howe, Carson City, NV (US)

(73) Assignee: LSP Products Group, Carson City, NV (US)

( * ) Notice: Subject to any disclaimer, the term of this patent is extended or adjusted under 35 U.S.C. 154(b) by 154 days.

(21) Appl. No.: 09/779,780

(22) Filed: Feb. 8, 2001

(65) Prior Publication Data

US 2002/0104566 A1 Aug. 8, 2002

(51) Int. Cl.[7] ............................................... F16K 31/34
(52) U.S. Cl. ...................... 137/414; 137/426; 137/430; 251/46
(58) Field of Search ................................. 137/413, 414, 137/426, 430; 251/11, 28, 45, 46, 75

(56) References Cited

U.S. PATENT DOCUMENTS

| 2,572,175 | A |   | 10/1951 | McPherson | 137/139 |
| 3,895,645 | A |   | 7/1975  | Johnson   | 137/403 |
| 3,955,791 | A |   | 5/1976  | Meckstroth| 251/11  |
| 4,094,327 | A | * | 6/1978  | Brandelli | 137/403 |
| 4,248,402 | A |   | 2/1981  | Meckstroth| 251/11  |
| 4,431,024 | A | * | 2/1984  | Gallagher | 137/413 |
| 4,561,627 | A |   | 12/1985 | Meckstroth| 251/11  |
| 4,646,779 | A |   | 3/1987  | Johnson   | 137/426 |
| 4,944,326 | A | * | 7/1990  | Hsieh     | 137/414 |
| 5,067,516 | A |   | 11/1991 | Gale      | 137/414 |
| 5,191,912 | A |   | 3/1993  | McDaniel  | 137/413 |
| 5,280,803 | A | * | 1/1994  | Swift et al. | 137/414 |
| 5,638,859 | A |   | 6/1997  | Thomson et al. | 137/414 |
| 5,715,859 | A |   | 2/1998  | Nichols-Roy | 137/426 |
| 5,836,346 | A |   | 11/1998 | Nichols-Roy | 137/414 |
| 6,003,541 | A |   | 12/1999 | Nichols-Roy | 137/315 |

* cited by examiner

Primary Examiner—Michael Powell Buiz
Assistant Examiner—Ramesh Krishnamurthy
(74) Attorney, Agent, or Firm—Locke Liddell & Sapp LLP; Monty L. Ross; Michael W. Dubner

(57) ABSTRACT

A snap-action piloted fill valve for controlling the level in a liquid storage tank, the valve having a float and a weight cup that are adjustably interconnected by an elongated sleeve slidably disposed on a stem extending upwardly from a valve body mounted inside a tank, the weight cup being further connected to a snap-action beam attached to the valve body. The snap-action beam controls operation of a pilot, which in turn causes the fill valve to open when the beam is in its upward position and to close when the beam is in its downward postion. Use as a toilet valve is also disclosed.

20 Claims, 4 Drawing Sheets

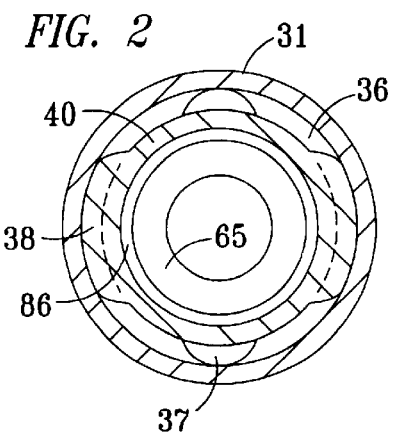
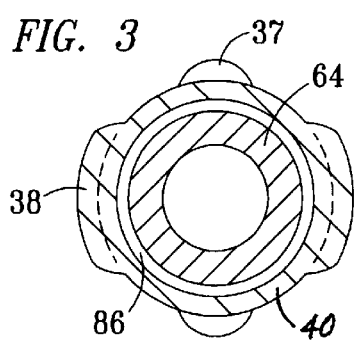
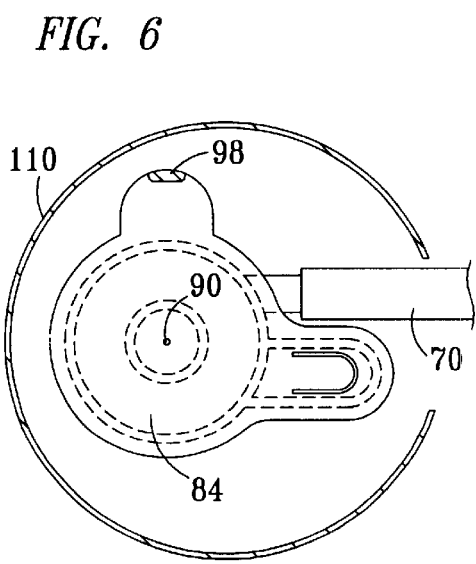
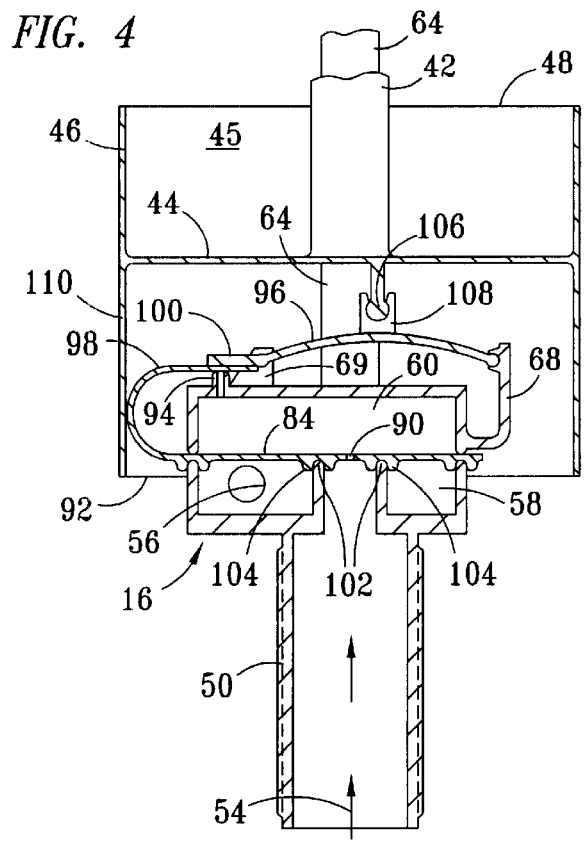
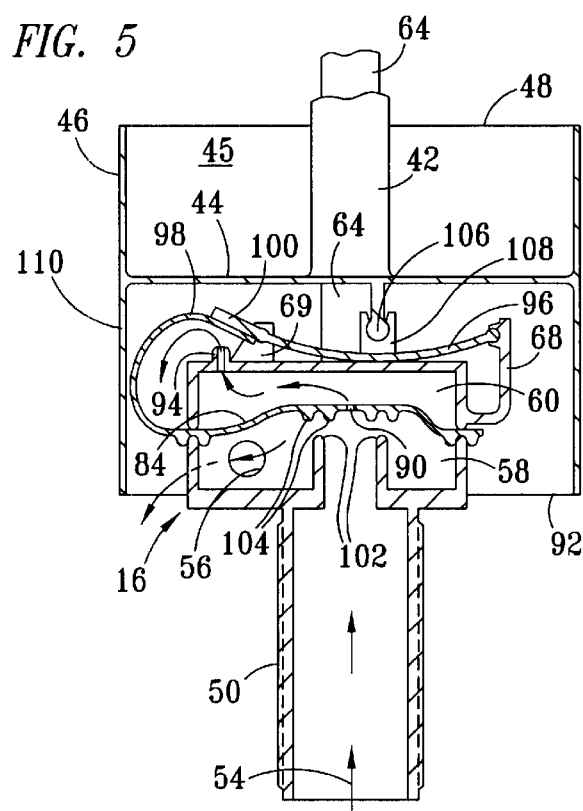

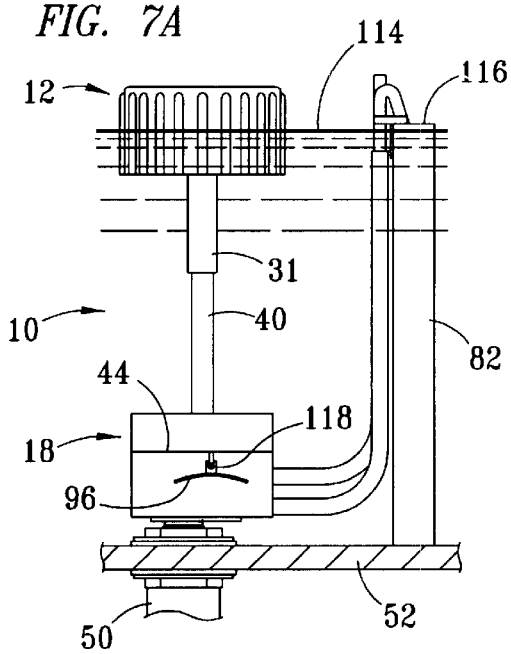
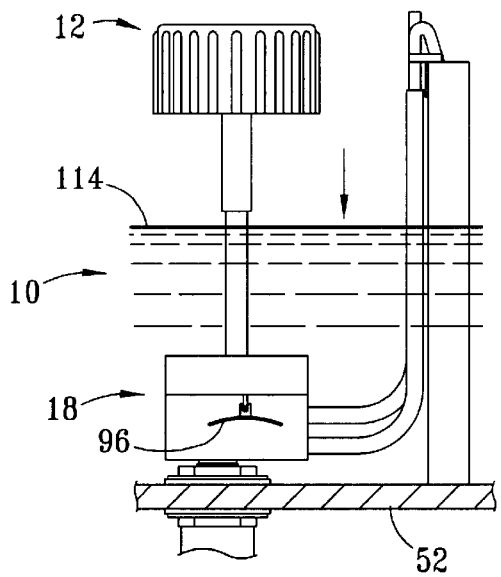
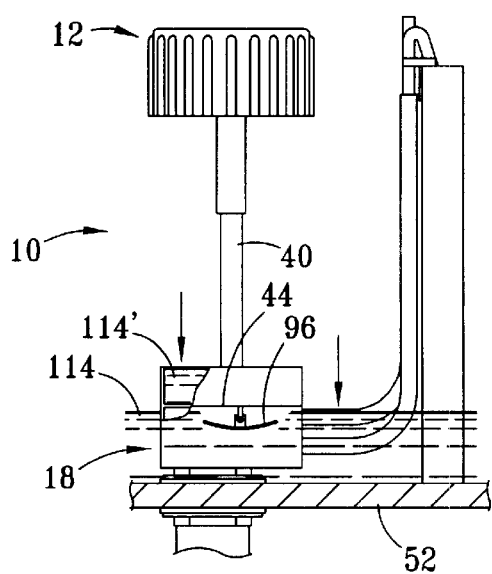

SNAP-ACTION PILOTED FILL VALVE

BACKGROUND OF THE INVENTION

1. Field of the Invention

This invention relates to tank fill valves, and more particularly, to a snap-action piloted fill valve useful for controlling the fluid level in a tank such as those used as water reservoirs for conventional toilets.

2. Description of Related Art

Fill valves using floats disposed inside housings are well known in the art, being disclosed for example in U.S. Pat. Nos. 6,003,541 and 5,638,859. U.S. Pat. No. 6,003,541 discloses a storage tank fill valve having a float arm which opens and closes a pilot orifice in a diaphragm valve. U.S. Pat. No. 5,638,859 discloses a float disposed within a cylindrical float chamber, with a pivotable arm connecting the float to the valve. Valve shuttle means are disclosed for controlling fluid flow from the float chamber in response to the movement of the float and pivotable arm.

Snap action piloted fill valves are also previously known. U.S. Pat. No. 4,248,402, for example, discloses a valve with a heating element that is energized to cause a bimetal disc to snap over-center between open and closed valve positions.

Other pilot and fill valve assemblies are disclosed in U.S. Pat. Nos. 2,572,175; 3,955,791; 3,895,645; 4,561,627; 4,646,779; 5,067,516; 5,191,912; 5,715,859 and 5,836,346.

SUMMARY OF THE INVENTION

The piloted fill valve disclosed herein has a unique structure and snap-action operation that causes the valve to be either fully open or fully closed. The valve preferably comprises a float and a weight cup that are interconnected by an elongated sleeve slidably disposed on a stem extending upwardly from a valve body mounted in a tank. Rising liquid inside the tank causes the float to slide upwardly on the stem, also pulling the weight cup upwardly. As the liquid level inside the tank approaches the desired fill level, the float pulls the sleeve and weight cup upwardly relative to the valve body. A substantially rigid link between the weight cup and a snap-action beam connected to the valve body is tightened as the weight cup rises relative to the valve body, causing the beam to move through an over-center position, which closes the pilot and thereby also closes the fill valve. When the tank is drained or flushed, the float, sleeve and weight cup slide downwardly on the stem, and the weight of liquid retained in the weight cup causes the beam to snap downwardly through its over-center position as the liquid level in the tank drops to a predetermined level, thereby opening the pilot and the fill valve, and permitting the tank to refill. The float, sleeve and weight cup are designed so that their combined weight is insufficient to snap the beam back through its over-center position to open the pilot and fill valve until the tank drains to a predetermined level. The vertical separation between the float and the weight cup is preferably adjustable to permit selective control over the liquid level at which the fill valve closes. The operation of the snap-action beam is desirably sudden and definite as it opens and closes the pilot, avoiding dribbling or partial flow during the change of position.

According to one embodiment of the invention, a piloted fill valve is disclosed that comprises a single elastomeric member useful as a seal for the pilot, as a diaphragm for the fill valve, and optionally, as a seal for a vacuum breaker.

According to another embodiment of the invention, the position of the float relative to the weight cup is manually adjustable using threads or detent members that selectively position the float at a desired height on the elongated sleeve.

BRIEF DESCRIPTION OF THE DRAWINGS

The apparatus of the invention is further described and explained in relation to the following figures of the drawings wherein:

FIG. 2 is a section view taken along line 2—2 of FIG. 1;

FIG. 3 is a section view taken along line 3—3 of FIG. 1;

FIG. 4 is a section view of the weight cup and valve assembly taken along line 4—4 of FIG. 1, showing the snap-action beam, the pilot and the fill valve in closed position;

FIG. 5 is a section view as in FIG. 4, but where the snap-action beam, pilot and fill valve are shown in the open position;

FIG. 6 is a section view of the weight cup and valve assembly taken along line 6—6 of FIG. 1; and FIGS. 7A–7E are simplified diagrammatic views illustrating the relative positions of the float cup, weight cup, snap-action beam and liquid level at each stage of a typical fill and drain cycle.

DESCRIPTION OF THE PREFERRED EMBODIMENTS

The preferred embodiment of the piloted fill valve disclosed herein is specially adapted for use as a fill valve for the water storage tank of a conventional toilet. It will be understood and appreciated by those of ordinary skill in the art upon reading this disclosure, however, that the inventive fill valve and float assembly of the invention are likewise suitable for refilling liquid tanks used in other applications as well. It will also be apparent that, when used in such other applications, the subject piloted fill valve is suitable for refilling and monitoring the level of liquids other than water.

Figure 1:
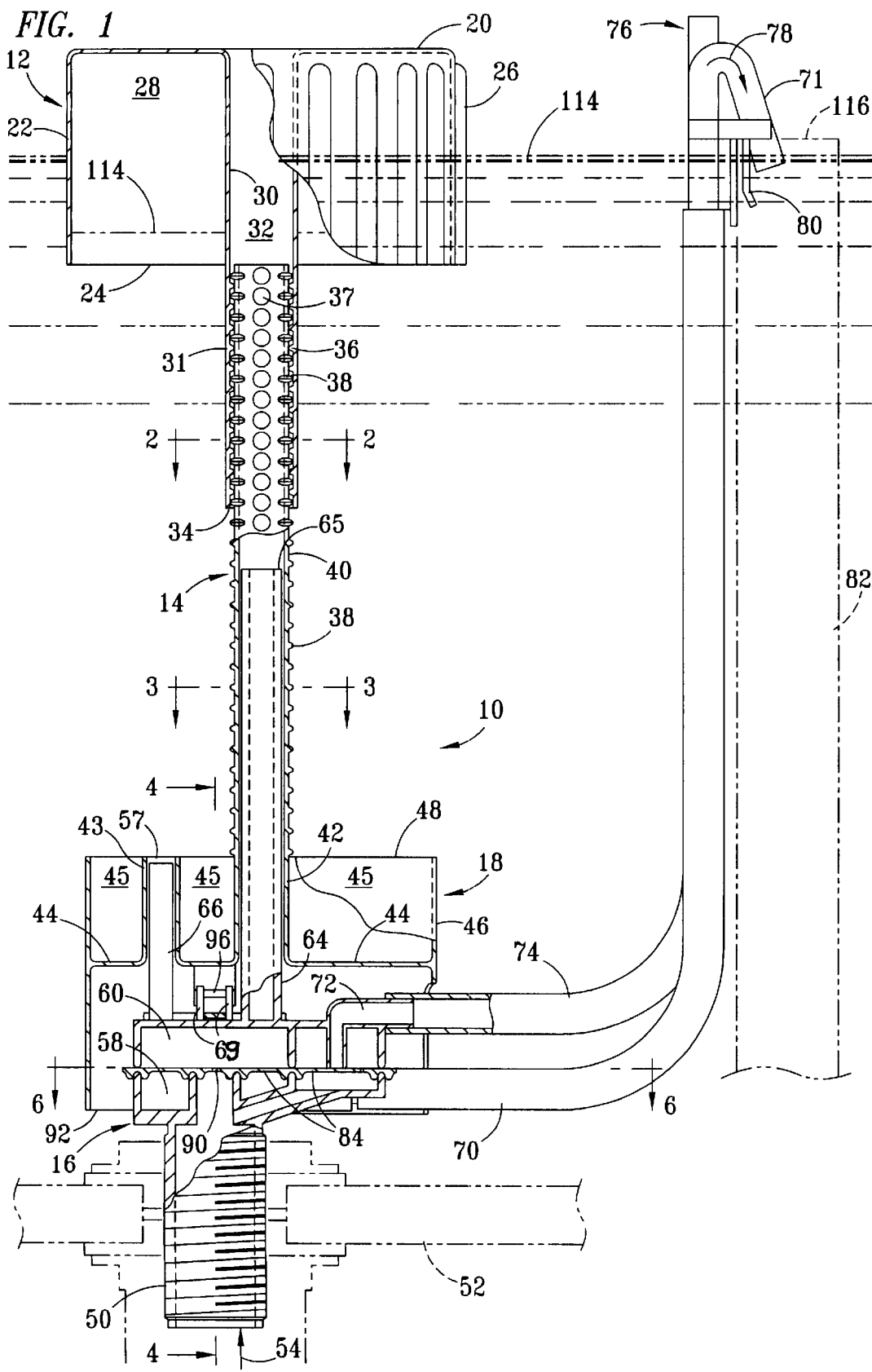
FIG. 1 is an elevation view, partially broken away and partially in section, of the snap-action piloted fill valve of the invention as installed inside a tank, with the tank, liquid inside the tank and the overflow tube shown in phantom.

Referring to FIG. 1, piloted fill valve 10 preferably comprises float member 12, elongated sleeve 14, valve body 16 and weight cup 18. Taken together, float member 12, elongated sleeve 14 and weight cup 18 form a float assembly that moves upward and downward in unison as liquid level 114 rises and falls within predetermined limits as discussed in greater detail below. Float member 12 preferably has the shape of an inverted cup with a substantially circular top wall 20 bounded around its circumference by a cylindrical skirt 22 terminating at bottom edge 24. Outwardly projecting vertical ribs 26 are desirably spaced circumferentially around skirt 22 to facilitate manual grasping as needed to adjust and reposition float member 12 relative to elongated sleeve 14. According to a preferred embodiment of the invention, top wall 20 of float member 12 further comprises a centrally disposed, axially extending bore 32 defined by substantially cylindrical sidewall 31 with inside surface 30 that extends from top wall 20 to bottom edge 34. Cylindrical wall 31 preferably has a diameter such that the upwardly extending end of elongated sleeve 14 can be received into adjustable engagement with it. Bottom edge 34 is preferably lower than bottom edge 24 of skirt 22 to facilitate adjustment and repositioning relative to elongated sleeve 14. When water level 114 rises above bottom edge 24 of cylindrical skirt 22 around float member 12, air is trapped and slightly compressed in contained headspace 28, providing additional buoyancy to float member 12. While a float member 12 in the configuration depicted in FIG. 1 is a preferred embodiment for use in the present invention, float members having other similarly effective shapes and buoyancy can also be used provided that they are coupled to an elongated sleeve and weight cup as described herein.

Manually operable engagement means are desirably provided inside wall 31 and outside elongated sleeve 14 to permit selective adjustment of the height of float member 12 relative to weight cup 18. One such means is shown in FIGS. 1 and 2, where the inside surface of cylindrical sidewall 31 of float member 12 preferably comprises inwardly projecting interrupted threads 36 adapted to engage radially projecting interrupted threads 38 and protrusions 37 on elongated sleeve 14. By grasping cylindrical skirt 22 and rotating float member 12 relative to elongated sleeve 14, the user can selectively adjust the height of float member 12 inside the tank. With this interference configuration, sidewall 31 of float member 12 may deform slightly as protrusions 37 ride over interrupted threads 36. It is understood, however, that the disclosed engagement means can be reversed or modified on the two slidably engaged stem members 31, 14, and that many other similarly effective means can likewise be used to provide for selective adjustment or releasable locking of float member 12 at various heights on elongated sleeve 14. Thus, for example, continuous threads, detent mechanisms, retainer clips and rings, latches and other biasing devices can also be used. The combined height of elongated sleeve 14 and sidewall 31 are preferably such that float member 12 can be positioned high enough to permit water level 114 to rise to top wall 116 of drain pipe 82 if desired.

Referring to FIGS. 1 and 3, elongated sleeve member 14 preferably further comprises an elongated sleeve portion 40 extending downwardly from float member 12 and a cylindrical bore slightly greater in diameter than the outside diameter of guide stem 64, which extends upwardly from valve body 16 (FIGS. 2 and 3 depict annular space 86 between guide stem 64, having end wall 65, and elongated sleeve portion 40). Guide stem 64 preferably extends upwardly into the axial bore of elongated sleeve portion 40 in such manner that smooth, sliding engagement occurs between the inside wall of sleeve portion 40 and the outside wall of guide stem 64, without binding or sticking as the float assembly rises and falls according to the liquid level inside the tank. The height of end wall 65 of guide stem 64 is preferably sufficient to provide steady engagement and smooth sliding action over the range of travel of sleeve portion 40 over guide stem 64. Because radially projecting interrupted threads 38 (and projections 37, although not visible due to the section broken away) preferably extend all the way down the outside of sleeve portion 40 to weight cup 18, it is apparent from FIG. 1 that, if desired, float member 12 can be lowered down elongated sleeve 14 until sleeve 14 extends through and out the top of bore 32 of float member 12, with the bottom limit of float member 12 being the position where bottom edge 34 of float member 12 abuts weight cup 18. The lower that float member 12 is positioned relative to weight cup 18, the lower water level 114 will rise inside the tank before piloted fill valve 10 terminates the inlet flow from a pressurized liquid source as symbolized by arrow 54.

Referring next to FIGS. 1 and 4–6, weight cup 18 is unitarily formed at the bottom of elongated sleeve 14. When the float assembly of the invention is made in this manner, it comprises only two parts, float member 12 and the unitary elongated sleeve 14 with weight cup 18. Both parts can be injection molded from a suitable moldable thermoplastic resin, for example, and can be assembled and attached to valve body 16 without tools. Alternatively, weight cup 18 can be separately made of either metal or plastic apart from elongated sleeve 14 and then joined or connected to it using any suitable, commercially available fastener, adhesive or other means. It will be further appreciated that if weight cup 18 is made separately from elongated sleeve 14 and has adjustment provisions incorporated similar to the ones used on float member 12, weight cup 18 can be positioned along sleeve 14 to adjust the fluid "turn-on" level independently from the fluid "turn-off" level. It is further understood that link 108 would then be attached to elongated sleeve 14 so that adjustment of weight cup 18 could be achieved. Weight cup 18 preferably further comprises laterally extending circular transverse wall 44 bounded along its periphery by an upwardly directed, substantially cylindrical sidewall section 46 extending above transverse wall 44 to top edge 48, and a downwardly directed, substantially cylindrical skirt portion 110 terminating at bottom edge 92. Laterally spaced cylindrical sleeve sections 42, 43 preferably extend upwardly from transverse wall 44 inwardly of sidewall and skirt sections 46, 110 to provide sliding engagement with guide stem 64 as described above, and with anti-rotation pin 66, both of which project upwardly from valve body 16. Anti-rotation pin 66 inside cylindrical bore 57 restricts rotation of elongated sleeve 14 and weight cup 18 relative to valve body 16 whenever float member 12 is rotated by the user to adjust its position on elongated sleeve 14. While the use of an anti-rotation pin 66 is preferred, it should be understood that other similarly effective means can likewise be used within the scope of the invention to restrict relative rotational motion between weight cup 18 and valve body 16. Thus, for example, sleeve sections 40, 42 can be made with an internally projecting, longitudinally extending spline adapted to mate with a cooperatively aligned slot or keyway in guide stem 64. According to another embodiment, both sleeve sections 40, 42 and guide stem 64 can be made with non-circular cross-sections so that elongated sleeve 14 will not rotate around guide stem 64 when float member 12 is rotated while adjusting its height on elongated sleeve 14. In addition to these, many other structural or mechanical interlocks can be provided as desired.

Volume 45 defined by the interior space disposed inwardly of cylindrical sidewall 46 around sleeve members 43, 64 between transverse wall 44 and top edge 48 will typically be substantially full of liquid at all times during use. When the tank water level 114 falls below top wall 48 of weight cup 18, weight cup 18 will retain liquid. The magnitude of volume 45 is significant because the weight of liquid retained in weight cup 18 during draining or flushing affects activation of the fill valve for reasons described below. Bottom edge 92 of skirt section 110 can vary in height to provide clearance for hoses, outlets, etc. emanating from valve body 16.

Referring again to FIGS. 1 and 4–6, valve body 16 preferably comprises lower chamber 58 and upper chamber 60, which are separated by elastomeric diaphragm 84. Valve body 16 further comprises male threaded nipple 50 that extends downwardly through bottom wall 52 of the water storage tank of a conventional toilet and is secured to bottom wall 52 using conventional nuts, washers and gaskets suitable for achieving a leak-tight fit. Only a portion of the bottom wall of tank 52 is shown (in phantom outline) to illustrate attachment of piloted fill valve 10, with the remainder of the tank being broken away. When seated in the position depicted in FIGS. 1 and 4, diaphragm 84 provides a fluid-tight seal between the two chambers except for bleed hole 90, through which a minor amount of pressurized fluid received through nipple 50 from source 54 flows into upper chamber 60 communicating with pilot port 94.

According to one preferred embodiment of the invention, as seen in FIGS. 4 and 5, a web of elastomeric material formed unitarily with diaphragm 84 extends upwardly around upper chamber 60 of valve body 16 and is attached there to the underside of cantilevered end 100 of flexible snap-action beam 96, which is aligned with pilot port 94. Snap-action beam 96 is preferably supported in a substantially horizontal position over valve body 16 between the top of resilient cantilevered support arm 68 and fixed support mount 69. The lateral distance between arm 68 and mount 69 is desirably slightly less than the length of snap-action beam 96 between the points of attachment to the arm 68 and mount 69 so that snap-action beam 96 is forced to bow either upwardly or downwardly relative to the top of valve body 16 when relaxed. Snap-action beam 96 is preferably attached to cantilevered support arm 68 at the end of beam 96 that is opposite pilot port 94. The point of pivotable attachment of snap-action beam 96 to mount 69 is desirably spaced inwardly from the end of beam 96 that is aligned with pilot port 94. The attachment of snap-action beam 96 to fixed mount 69 is pivotable so that cantilevered end 100 of beam 96 is pivoted downwardly to cover pilot port 94 whenever the span of beam 96 between arm 68 and mount 69 is bowed upwardly. Conversely, cantilevered end 100 of beam 96 is pivoted upwardly away from pilot port 94, uncovering the port, whenever the span of beam 96 between support arm 68 and fixed mount 69 is bowed downwardly. Because snap-action beam 96 is effectively incompressible between support arm 68 and mount 69, support arm 68 is preferably designed to flex laterally away from fixed mount 69 for an instant whenever snap-action beam 96 is flexed through its over-center position. However, support arm 68 is sufficiently resistant to outward flexing that snap-beam 96 returns to a bowed position immediately after being driven through the over-center position. Both snap-action beam 96 and support arm 68 are desirably made from materials and with dimensions such that they are durable enough for long term service and can withstand thousands of cycles of operation without failure. Beam 96, support arm 68 and mount 69 are all preferably made with any suitable, commercially available polymeric material, although metals can also be used as construction materials in making all or a portion of these parts if desired.

The flexing of snap-action beam 96 between the upwardly and downwardly bowed positions, as shown in FIGS. 4 and 5, respectively, is controlled by the movement of weight cup 18 as it slides up and down guide stem 64 in response to rising and falling of the float assembly, which is in turn dependent upon water level 114 inside the tank as described above in relation to FIG. 1. In the preferred embodiment, weight cup 18 is connected to snap-action beam 96 of valve body 16 by a link that is sufficiently strong to overpressure the resistance of beam 96 to flexure through its over-center position. Thus, when weight cup 18 moves downwardly relative to snap-action beam 96 in response to a falling liquid level, the link should cause beam 96 to bow downwardly. When weight cup 18 moves upwardly in response to a rising liquid level, the link should cause beam 96 to move through the over-center position to the position where beam 96 bows upwardly. The link can take many different forms, and is preferably engageable and releasable by manual force during assembly and disassembly, respectively, of the piloted fill valve. Alternatively, however, a more durable mechanical link can be provided such as, for example, a metal strap that is riveted or otherwise fastened to both weight cup 18 and to snap beam 96. The link should be resistant to both elongation and compression so that firm pressure can be exerted on beam 96 as weight cup 18 of the float assembly rises and falls. According to a preferred embodiment of the invention, the link between weight cup 18 and snap-action beam 96 comprises two frictionally engageable parts, a male member 106 having a rounded end that projects downwardly from transverse wall 44, and a female member 108 attached to snap-action beam 96 that receives and frictionally engages male member 106. With this embodiment, the force required to remove male member 106 from female member 108 must be greater than the force required to flex snap-action beam 96 upwardly from the downwardly bowed position seen in FIG. 5, through the over-center position against the resistance of support arm 68, to the upwardly bowed position seen in FIG. 4 so that beam 96 can be repositioned without disengaging male member 106 from female member 108.

Whenever snap-action beam 96 is flexed upwardly as seen in FIG. 4, cantilevered end 100, with elastomeric web 98 attached to the underside thereof, is forced downwardly over the top of pilot port 94, thereby causing diaphragm 84 between upper chamber 60 and lower chamber 58 to be pressured downwardly so that elastomeric sealing projections 104 on the underside of diaphragm 84 seat tightly against the top end 102 of the pressurized liquid inlet to lower chamber 58. This interrupts the fluid communication between pressurized inlet source 54 and fill valve exit port 56, causing the tank to stop filling.

Whenever snap-action beam 96 is flexed downwardly as seen in FIG. 5, cantilevered end 100, with elastomeric web 98 attached to the underside thereof, is forced upwardly over the top of pilot port 94, and diaphragm 84 is pressured upwardly between upper chamber 60 and lower chamber 58 to be so that elastomeric sealing projections 104 on the underside of diaphragm 84 are elevated above the top end 102 of the pressurized liquid inlet to lower chamber 58. This reestablishes the fluid communication between pressurized inlet source 54 and fill valve exit port 56, causing the tank to resume filling.

In reading this disclosure, it should be understood and appreciated that the tank is emptied, thereby lowering the liquid level inside the tank, whenever the flush valve or drain valve is opened by means not constituting part of the invention. In the preferred embodiment of a conventional toilet installation, the storage tank is drained by actuating the flush lever, which in turn opens the flush valve. Once the water inside the storage tank drains to a level where the combined weight of the float assembly as described herein and the liquid retained in the weight cup 18 cause the force exerted on the link to snap-action beam 96 to overpressure beam 96 through the over-center position, beam 96 snaps to the downwardly bowed position, activating the pilot and fill valve, causing the tank to refill provided that the flush or drain valve has by then closed.

Referring to the preferred embodiment of the invention as visible in FIGS. 1 and 6, piloted fill valve 10 preferably further comprises a vacuum breaker port 72 that communicates with atmosphere 76 above liquid level 114 through line 74, and a toilet bowl fill line 70 that discharges a flow 78 of pressurized water through spout 71 into top end 116 of overflow drain pipe 82 while the tank is refilling. Lines 70, 74 are preferably attached to drain pipe 82 by resilient clip 80, as seen in FIG. 1.

Figure 7D:
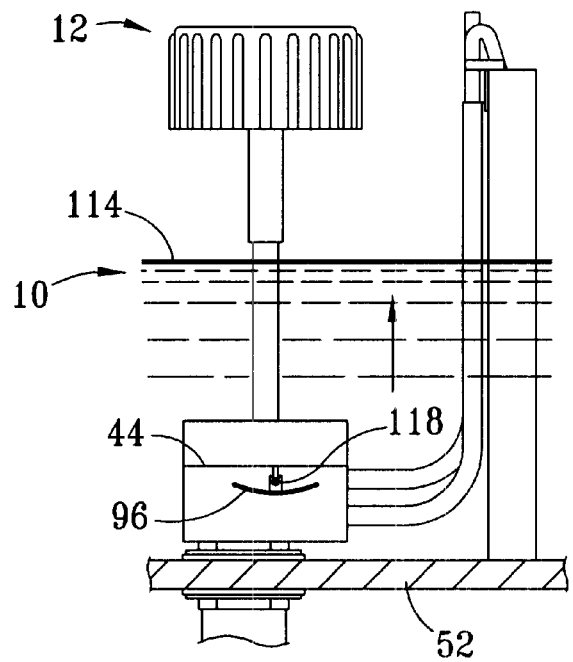

The manner in which operation of piloted fill valve 10 of the invention is controlled by the float assembly and snap-action beam 96 is summarized in relation to simplified, diagrammatic FIGS. 7A–7E where valve 10 is installed as a toilet fill valve. In FIG. 7A, the storage tank is full, water level 114 is slightly below top 116 of drain pipe 82, float member 12 is set at its uppermost operational height relative to both drain pipe 82 and tank bottom 52, snap-action beam is bowed upwardly by link 118 to transverse wall 44 of weight cup 18, and the valve is closed.

In FIG. 7B, the toilet has been flushed and water level 114 is falling. Because float member 12 is no longer providing buoyancy to weight cup 18 through sleeve 31 attached to elongated sleeve 40, weight cup 18 has started to exert a downward force on snap-action beam 96. Because weight cup is still being supported to some extent by the water displaced by the float assembly, the downward force is not yet sufficient to pressure beam 96 downwardly through the over-center position, and weight cup 18 settles very slightly in relation to tank bottom 52.

In FIG. 7C, water level 114 is near its lowest operational level, and the combined weight of the float assembly and the water retained at level 114' in weight cup 18 has pressured snap-action beam 96 through its over-center position so that beam 96 is now downwardly bowed and piloted fill valve 10 is opened.

In FIG. 7D, water level 114 is again rising inside the storage tank. Because the rising water has not yet reached float member 12, weight cup 18 is pulling only slightly on link 118 connecting transverse wall 44 to snap-action beam 96.

Figure 7E:
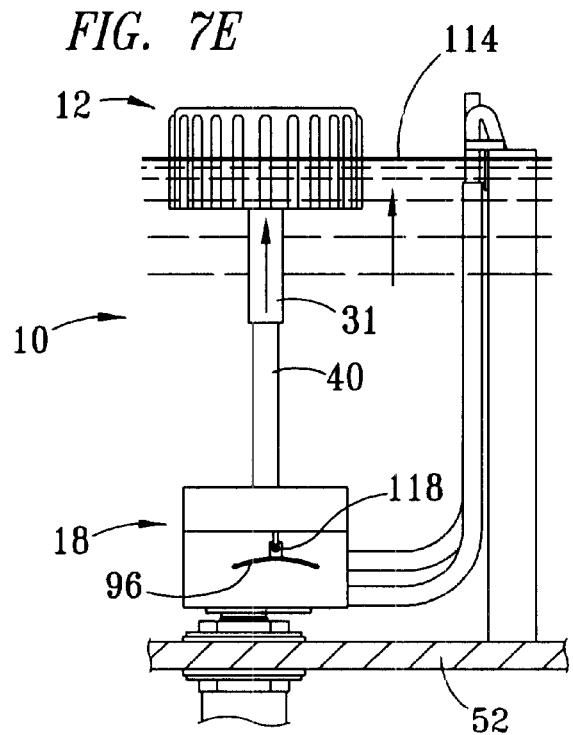

In FIG. 7E, water level 114 has risen sufficiently to cause float member 12 to exert sufficient additional force upwardly through sleeve 31 and elongated sleeve 40 that link 118 under weight cup 18 has pulled snap-action beam 96 upwardly through its over-center position, thereby closing the pilot and causing fill valve 10 to close.

Referring to FIGS. 1, 4 and 5–7, it will be appreciated that the limits of the vertical travel of float member 12 and weight cup 18 are controlled by the difference in height between the uppermost portion of snap-action beam 96 when in the upwardly flexed position and the same portion of snap-action beam 96 when in the downwardly flexed position.

Using the piloted fill valve disclosed herein, the liquid fill level inside the tank can be easily adjusted without using tools. Liquid flow to refill the tank starts only when the tank is empty, so that the valve is not trying to refill the tank while the tank is still draining. All pressure-holding parts are located at the bottom of the tank, and there are no o-ring seals between telescoping tubes that will eventually leak and require replacement.

Other alterations and modifications of the invention will likewise become apparent to those of ordinary skill in the art upon reading the present disclosure, and it is intended that the scope of the invention disclosed herein be limited only by the broadest interpretation of the appended claims to which the inventor is legally entitled.

What is claimed is:

1. A piloted fill valve for cyclically filling a tank with liquid, the valve comprising:
    a valve body attachable to the tank, the valve body having an inlet, an outlet, a pilot and an upwardly directed stem;
    a snap-action beam attached to the valve body, the snap-action beam being adapted to be reciprocated between first and second positions through an intermediate over-center position to open and close the pilot;
    a sleeve slidably engaging the stem;
    a float selectively positionable on the sleeve;
    a weight cup connected to the sleeve below the float; and
    a substantially inextendable and incompressible link connecting the weight cup to the snap-action beam.
2. The piloted fill valve of claim 1 wherein the float, sleeve and weight cup are coaxially aligned.
3. The piloted fill valve of claim 1 wherein the pilot comprises an opening and wherein the snap-action beam is attached to a web that alternately uncovers and covers the opening as the snap-action beam reciprocates between the first and second positions.
4. The piloted fill valve of claim 3 wherein the valve body further comprises a pilot chamber communicating with the pilot opening, a valve chamber establishing a liquid flow path communicating with the inlet and outlet, and a diaphragm separating the pilot and valve chambers.
5. The piloted fill valve of claim 4 wherein the valve body further comprises a seat between the inlet and outlet against which the diaphragm seats to block the liquid flow path between the inlet and outlet whenever the web covers the pilot opening.
6. The piloted fill valve of claim 1 wherein the inlet is connectable to a pressurized liquid source.
7. The piloted fill valve of claim 4 wherein the web and the diaphragm are unitarily formed.
8. The piloted fill valve of claim 4 wherein the web and the diaphragm are made of an elastomeric material.
9. The piloted fill valve of claim 4 wherein the diaphragm comprises a bleed hole.
10. The piloted fill valve of claim 4 wherein the valve body further comprises a vacuum breaker.
11. The piloted fill valve of claim 1, further comprising a device limiting relative rotational movement between the weight cup and the valve body.
12. The piloted fill valve of claim 1, further comprising a structure limiting relative rotational movement between the weight cup and the valve body.
13. The piloted fill valve of claim 1 when attachable to a toilet tank.
14. The piloted fill valve of claim 10 further comprising a vacuum breaker seal made unitarily with the web and the diaphragm.
15. The piloted fill valve of claim 1 wherein the snap-action beam comprises a cantilevered section.
16. The piloted fill valve of claim 15 wherein the cantilevered section opens and closes the pilot as the snap-action beam is reciprocated.
17. The piloted fill valve of claim 1 wherein the snap-action beam is reciprocated by upward and downward movement of the weight cup relative to the valve body.
18. The piloted fill valve of claim 1 wherein the float, sleeve, weight cup and valve body are made of plastic.
19. The piloted fill valve of claim 1 wherein the float has an outside wall that is substantially cylindrical.
20. The piloted fill valve of claim 1 wherein the weight cup has an outside wall that is substantially cylindrical.

* * * * *